United States Patent [19]

Spiro et al.

[11] Patent Number: 5,685,506
[45] Date of Patent: Nov. 11, 1997

[54] INSECT ABATEMENT SYSTEM

[75] Inventors: Clifford Lawrence Spiro, Niskayuna; Timothy Brydon Burnell, Schenectady; Jeffrey Hayward Wengrovius, Scotia, all of N.Y.

[73] Assignee: General Electric Company, Schenectady, N.Y.

[21] Appl. No.: 414,167

[22] Filed: Mar. 31, 1995

[51] Int. Cl.$^6$ ............................ B32B 7/02; B32B 25/20; B64C 21/10

[52] U.S. Cl. .................. 244/121; 244/133; 244/134 A; 244/134 E; 427/407.1; 428/336; 428/447; 428/450; 428/451

[58] Field of Search ..................... 244/133, 126, 244/134 A, 134 E, 121; 428/447, 450, 451, 215, 336; 427/407.1

[56] References Cited

U.S. PATENT DOCUMENTS

| | | | |
|---|---|---|---|
| 2,567,804 | 9/1951 | Davies | 244/134 A |
| 5,187,015 | 2/1993 | Yorkgitis et al. | 428/447 |

FOREIGN PATENT DOCUMENTS

| | | |
|---|---|---|
| 0369259 | 11/1989 | European Pat. Off. . |
| 2078544 | 1/1982 | United Kingdom . |
| 2240728 | 8/1991 | United Kingdom . |
| 2244715 | 12/1991 | United Kingdom . |
| 9306180 | 4/1993 | WIPO . |

OTHER PUBLICATIONS

C.C. Croom and B.J. Holmes, "Flight Evaluation of an Insect Contamination Protection System for Laminar Flow Wings", SAE 850860, 1985.

F.X. Worthmann, "A Possiblility of Avoiding Surface Roughness Due to Insects", NASA TM 77419, Mar. 1984.

O. Yi, N.S. Eiss and J.P. Wightman. "A Fundamental Approach to the Sticking of Insect Residues to Aircraft Wings", NASA–CR–183041, Sep. 1988.

N. Wes Gimbert, "A Study of Insect Contamination of Laminar Flow Surfaces", Aug. 13, 1993.

Encyclopedia of Polymer Science and Engineering, vol. 15, pp. 273–289, 1985.

*Primary Examiner*—Paul J. Thibodeau
*Assistant Examiner*—D. Lawrence Tarazano
*Attorney, Agent, or Firm*—William H. Pittman

[57] ABSTRACT

An insect abatement system prevents adhesion of insect debris to surfaces which must be kept substantially free of insect debris. An article is coated with an insect abatement coating comprising polyorganosiloxane with a Shore A hardness of less than 50 and a tensile strength of less than 4 MPa. A method for preventing the adhesion of insect debris to surfaces includes the step of applying an insect abatement coating to a surface which must be kept substantially free of insect debris.

9 Claims, No Drawings

INSECT ABATEMENT SYSTEM

This invention was made with government support under Contract No. NAS3-26617 awarded by NASA. The government has certain rights in this invention.

Background of the Invention

This invention relates to an insect abatement article. More specifically, it relates to an article which prevents rupture of insects and adhesion of the resultant debris to surfaces which must be kept substantially free of insect debris. It further relates to a method for preventing the adhesion of insect debris to surfaces.

To reduce drag on an aircraft and to increase fuel efficiency, aircraft surface roughness must be minimized. One contributor to aircraft surface roughness is insect contamination. When the insect collides with the aircraft, the insect cuticle ruptures. Insect fluid bonds the ruptured cuticle to the surface forming a disturbance that increases drag. To ensure smooth, uninterrupted air flow across the aircraft surface, a typical limit on surface uniformity is 0.05 mm. Debris from insect impact is often several times this height. This debris increases air flow turbulence and decreases fuel efficiency.

Insect contamination usually occurs on aircraft at altitudes below about 150 m, corresponding to take-off and initial climb. Insects can also be accumulated during landing and will impact subsequent flights unless they are removed while the plane is on the ground.

There have been numerous proposed solutions to this insect contamination. The use of a silicon foam rubber had been suggested in a report by F. X. Wortmann entitled "A Possibility of Avoiding Surface Roughness Due to Insect", NASA TM-77419, March 1984. However, it was documented in the report that the silicon foam rubber exhibits rain erosion problems. In their report, "Investigation of Factors Affecting the Sticking of Insects on Aircraft Wing Surface", (NASA CR-183041, Sept. 1988), O. Yi, N. S. Eiss and J. P. Wightman documented insect adhesion to various materials. They studied materials such as fluoroelastomer, synthetic rubber, polytetrafluoroethylene, polyurethane, styrene butadiene rubber, polyvinyl fluoride, polyester, polyethylene, polycarbonate and chlorotetrafluoroethylene. A synopsis of attempts to eliminate insect contamination, written in 1985, can be found in "Flight Evaluation of an Insect Contamination Protection System for Laminar Flow Wings", SAE 850860, by C. C. Croom and B. J. Holmes, in Table 1, page 14. Several coatings not recommended in the earlier works are listed as possible alternatives in "A Study of Insect Contamination of Laminar Flow Surfaces", dated 8/13/93, by N. Wes Gimbert.

Insect contamination is also a concern in the sport of high speed auto racing. As with aircraft, any surface roughness on the body of the land vehicle that increases surface friction and drag negatively impacts performance. The article of the instant invention can prevent the adherence of insect debris to the car, thereby reducing drag and improving racing results.

The present invention can also be used to inhibit insect adhesion to windshields, windows and any transparent surfaces. Adherence of insect debris to such surfaces reduces visibility, as well as increasing surface friction and drag.

Summary of the Invention

In accordance with the present invention, there is provided an insect abatement article comprising:

a. a surface, and, an insect abatement coating deposited onto said surface, wherein said insect abatement coating comprises a polyorganosiloxane with a Shore A hardness of less than 50 and a tensile strength of less than 4 MPa.

In accordance with another aspect of the present invention, there is provided a method of insect abatement comprising applying an insect abatement coating to a surface, wherein said insect abatement coating comprises a polyorganosiloxane with a Shore A hardness of less than 50 and a tensile strength of less than 4 MPa.

Description of Preferred Embodiment

The article disclosed in this invention includes a surface and an insect abatement coating deposited onto said surface. The method of the current invention requires applying an insect abatement coating to a surface.

Any surface where fluid flow must be maintained with as little surface friction and drag as possible can be coated with the insect abatement coating of the present invention. Such surfaces include certain areas on the bodies of airplanes. Certain surfaces of the aircraft, such as the leading edges of wings, empennages and inlet cowls, are particularly susceptible to insect accumulation. These surfaces are prone to collecting insect debris as the insects collide with the aircraft.

Surfaces that would benefit from the present invention are also found on land vehicles, particularly high speed racing cars, and any other land vehicles for which speed and a low coefficient of drag are important. These surfaces include the front bumper section, side panel, hood, roof and any other surface of a land vehicle where it is important to maintain smooth, uninterrupted air flow.

Adhesion of insect debris to surfaces that are transparent reduces visibility, as well as increasing drag. Insect debris adhesion can be minimized and even eliminated by the application of a substantially transparent insect abatement coating of the present invention to such surfaces. These surfaces include the transparent face shield of protective helmets, such as a motorcycle helmet, and the window or windshield of a land vehicle.

Suitable insect abatement coatings for the present invention comprise a polyorganosiloxane with a Shore A hardness of less than 50 and a tensile strength of less than 4 MPa. Shore A hardness is measured using the method of ASTM D638, which is incorporated herein by reference. Tensile strength is determined via ASTM method D2240, which is incorporated herein by reference. Materials with higher hardness and greater tensile strength promote adherence of insect debris to the surface. For use in the instant invention, preferable materials include a two-part, room temperature vulcanized, condensation cured polydialkylsiloxane. More preferably, the insect abatement coating comprises polydimethylsiloxane. Such polydimethylsiloxanes include materials marketed by General Electric Company under the trade names Exsil®2200, RTV 11 and RTV 21.

It preferred that the insect abatement coating be substantially free of voids. The preferred material of the instant invention is in contrast to the foamed material of the prior art. The insect abatement coating of the present invention preferably comprises a material which is not foamed, and therefore is substantially free of air bubbles or voids.

When the insect abatement coating is applied to a transparent surface, it is important that the insect abatement coating is also substantially transparent. Such transparent polydialkylsiloxanes are well known in the art.

The insect abatement coating can be applied to the surface by any method, including painting, spraying, and dipping. Surfaces can be made of any materials used to manufacture articles such as aircraft wings, empennages, inlet cowls, automobile bodies, windows, windshields, and face shields. The possible materials include steel, aluminum, plastic, and composite materials, including resin-impregnated fiberglass.

Depending on the material of the surface, it may be necessary to apply a primer to the surface prior to applying the insect abatement coating to ensure adhesion of the insect abatement coating to the surface. Such primers are well known in art. They include moisture curable grafted copolymers, which comprise polydialkylsiloxane and one or more ethylenically unsaturated monomers, and epoxy primers, which a comprise epoxy functionalized base material and a curing catalyst. Such moisture curable grafted copolymers and epoxy primers can be used individually or in conjunction with one another or with other primers.

Insect abatement coating thicknesses can range from 0.02 to 10 mm. The preferred thickness is 0.15 to 0.5 mm.

The following examples are presented to enable those skilled in the art to understand more clearly and practice the present invention. These examples should not be considered as a limitation upon the scope of the present invention, but merely as being illustrative and representative thereof.

In each of the following examples, the sample was considered to have passed if the insect debris was less than 0.05 mm high. Example 1 describes how insect debris in excess of the acceptable height limit adhered to an uncoated stainless steel plate. The article of the instant invention is described in Example 2, which showed how the height of the insect debris was reduced as a result of coating the plate. In Example 3, a thin layer of the insect abatement coating, which was less than the preferred thickness, resulted in some insect debris higher than the acceptable limit. However, even with the thin layer, the amount of insect debris that adhered to the coated plate was less than the amount that adhered to the uncoated plate of Example 1. In Example 4, a material with Shore A hardness in excess of 50 and a tensile strength greater than 4 MPa allowed insect debris higher than the acceptable limit of 0.05 mm to adhere to the plate. Example 5 detailed a new and unexpected result of the present invention: the insect abatement coating's resistance to grit erosion.

EXAMPLE 1 (CONTROL)

A wind tunnel was constructed that was equipped with an insect delivery system. Houseflies were deposited at an insect impingement velocity of 90 m/s onto a 304 stainless steel plate. The insect debris was analyzed by profilometry. One hundred percent of the insect impacts with the plate resulted in rupture of the insects and deposition of debris. The maximum reading possible with the profilometer was 0.36 mm. This debris measured at least 0.36 mm. Visual inspection indicated that the height of the debris was in excess of 0.51 mm.

EXAMPLE 2

Using the wind tunnel and insect delivery system of Example 1, house flies were deposited onto a plate coated with 0.5 mm of Exsil 2200 room temperature vulcanized silicone rubber. This material exhibits a Shore A hardness of 34 and a tensile strength of 2 MPa. Profilometry indicated that the insect debris that adhered to the coated plate was less than 0.02 mm high.

EXAMPLE 3

Using the wind tunnel and insect delivery system of Example 1, house flies were deposited onto a plate coated with 0.13 mm of Exsil 2200 room temperature vulcanized silicone rubber. Profilometry indicated that some of the insect debris that adhered to the coated plate was in excess of 0.150 mm high.

EXAMPLE 4 (CONTROL)

Using the wind tunnel and insect delivery system of Example 1, house flies were deposited onto a plate coated with 0.5 mm of RTV 560 room temperature vulcanized silicone rubber. This material exhibits a Shore A hardness of 60 and a tensile strength of 4.6 MPa. Profilometry indicated that much of the insect debris that adhered to the coated plate was in excess of 0.150 mm high.

EXAMPLE 5

A metal panel was coated with 0.5 mm of Exsil 2200. An SS White Industrial Abrasive Unit Model K grit blaster was pressurized to 0.5 MPa. An average of 15 grams/minute of #8 (50 microns) silicon carbide powder was accelerated through a jet nozzle onto the coated plate. The coating was examined microscopically before and after grit blasting. No change was noted in the coated surface. There was no damage to the Exsil silicone rubber surface. It remained shiny and without evidence of surface pitting or tearing.

What is claimed is:

1. An insect abatement article comprising:

a. an aircraft surface selected from the group consisting of aircraft wings, empennages and inlet cowls, and, b. an insect abatement coating deposited onto said surface, wherein said insect abatement coating comprises a room temperature vulcanized, condensation-cured polyorganosiloxane having a Shore A hardness of less than 50 and having a tensile strength of less than 4 MPa.

2. An article in accordance with claim 1, wherein said surface comprises materials selected from the group consisting of steel, aluminum and plastic.

3. An article in accordance with claim 1, wherein said polydialkylsiloxane comprises polydimethylsiloxane.

4. An article in accordance with claim 1, wherein said insect abatement coating is non-foamed.

5. An article in accordance with claim 1, wherein said insect abatement coating is 0.02 mm to 10 mm thick.

6. An article in accordance with claim 1, wherein said insect abatement coating is 0.15 mm to 5 mm thick.

7. A method of making an insect abatement aircraft surface, comprising applying a insect abatement coating to an aircraft surface selected from the group consisting of aircraft wings, empennages, and inlet cowls, wherein said insect abatement coating comprises a two part, room temperature vulcanizing condensation curable polydialkysiloxane, which upon curing has a Shore A hardness of less than 50 and a tensile strength of less than 4 MPa.

8. A method in accordance with claim 7 wherein said polydialkylsiloxane comprises polydimethylsiloxane.

9. A method in accordance with claim 7 further comprising the step of applying a primer to a surface, wherein said insect abatement coating is applied onto said primer.

* * * * *